United States Patent
Büscher

(10) Patent No.: US 11,673,651 B2
(45) Date of Patent: Jun. 13, 2023

(54) LEADING EDGE STRUCTURE FOR A FLOW CONTROL SYSTEM OF AN AIRCRAFT

(71) Applicant: AIRBUS OPERATIONS GmbH, Hamburg (DE)

(72) Inventor: Alexander Büscher, Hamburg (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 140 days.

(21) Appl. No.: 17/277,130

(22) PCT Filed: Sep. 18, 2019

(86) PCT No.: PCT/EP2019/075025
§ 371 (c)(1),
(2) Date: Mar. 17, 2021

(87) PCT Pub. No.: WO2020/058344
PCT Pub. Date: Mar. 26, 2020

(65) Prior Publication Data
US 2022/0048612 A1 Feb. 17, 2022

(30) Foreign Application Priority Data
Sep. 18, 2018 (DE) .................... 10 2018 122 908.9

(51) Int. Cl.
| | | |
|---|---|---|
| B64C 21/08 | (2023.01) | |
| B64C 5/06 | (2006.01) | |
| B64C 21/06 | (2023.01) | |

(52) U.S. Cl.
CPC ............... *B64C 21/08* (2013.01); *B64C 5/06* (2013.01); *B64C 21/06* (2013.01)

(58) Field of Classification Search
CPC ....... B64C 21/025; B64C 21/04; B64C 21/06; B64C 21/08; B64C 5/02; B64C 5/06
See application file for complete search history.

(56) References Cited

U.S. PATENT DOCUMENTS

| | | | |
|---|---|---|---|
| 3,920,203 A | 11/1975 | Moorehead | |
| 2010/0116943 A1* | 5/2010 | Meister .................. | B64D 15/04 244/208 |

(Continued)

FOREIGN PATENT DOCUMENTS

| | | |
|---|---|---|
| DE | 10 2016 204 210 | 9/2017 |
| EP | 2 387 529 | 11/2011 |

(Continued)

OTHER PUBLICATIONS

German Search Report for German Application No. 10 2018 122 908.9 dated Jun. 5, 2019, 7 pages.

(Continued)

*Primary Examiner* — Timothy D Collins
*Assistant Examiner* — Justin Michael Heston
(74) *Attorney, Agent, or Firm* — Nixon & Vanderhye P.C.

(57) ABSTRACT

A leading edge structure for a flow control system of an aircraft is disclosed having a leading edge panel that surrounds a plenum, wherein the leading edge panel has a first side portion, a second side portion opposite the first side portion, an inner surface facing the plenum and an outer surface in contact with an ambient flow, and wherein the leading edge panel comprises a plurality of micro pores forming a fluid connection between the plenum and the ambient flow, wherein the plenum is connected to an air outlet arrangement configured for causing an underpressure in the plenum, so that air from the ambient flow is drawn through the micro pores into the plenum and from there discharged through the air outlet arrangement into the ambient flow.

17 Claims, 2 Drawing Sheets

(56) References Cited

U.S. PATENT DOCUMENTS

Figure 1:
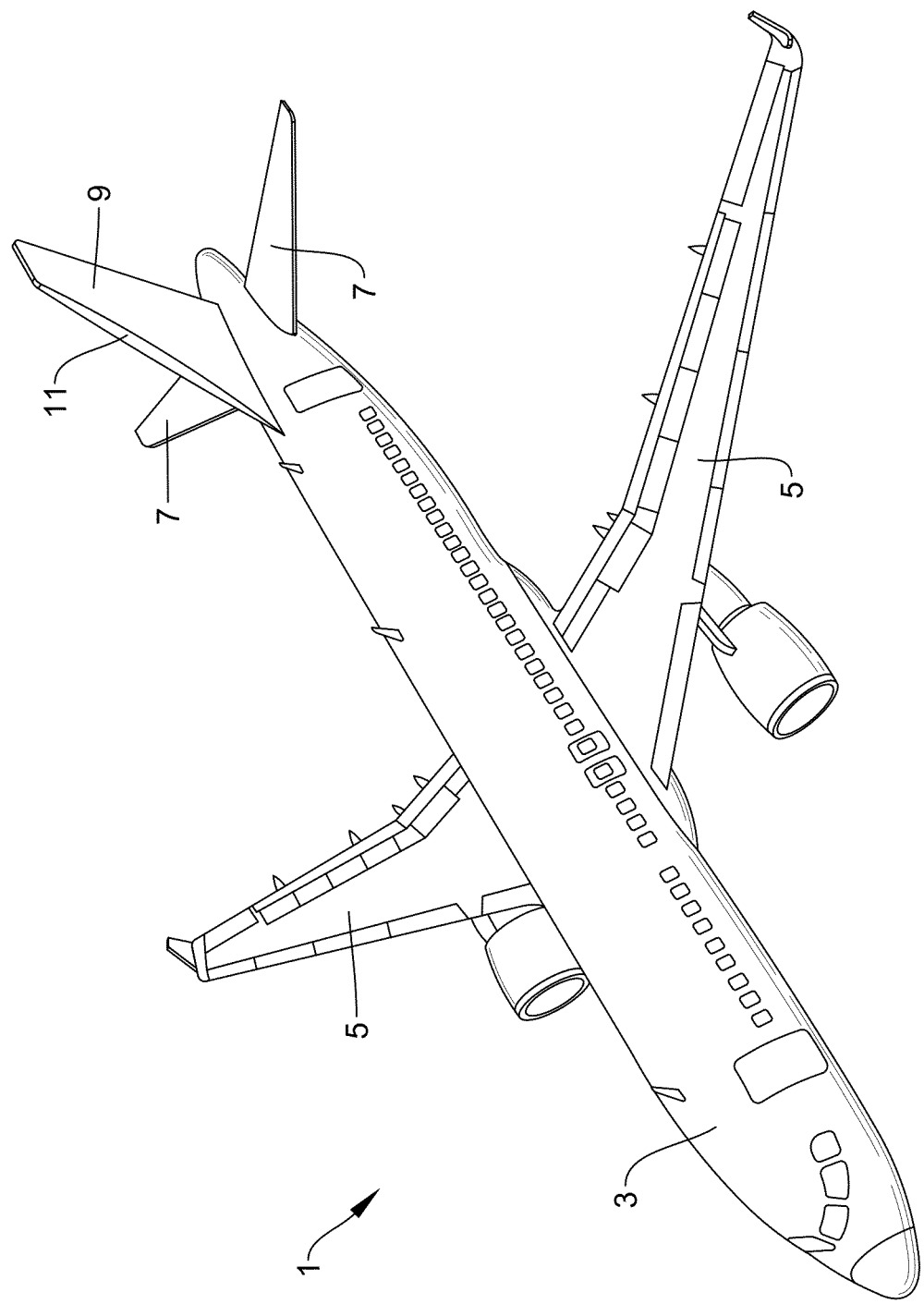

| | | | | |
|---|---|---|---|---|
| 2010/0181434 A1* | 7/2010 | Powell | ................... | B64C 21/08 244/209 |
| 2010/0181435 A1* | 7/2010 | Sakurai | ................. | B64C 21/08 244/209 |
| 2011/0103952 A1 | 5/2011 | Pesetsky | | |
| 2013/0270390 A1* | 10/2013 | Schrauf | .................. | B64C 21/06 244/119 |
| 2014/0021304 A1* | 1/2014 | Gerber | ................... | B64C 21/06 244/35 R |
| 2015/0083258 A1* | 3/2015 | Rupp | ....................... | B64F 5/00 137/803 |
| 2015/0083866 A1* | 3/2015 | Biedscheid | ........... | B64D 47/08 244/91 |
| 2015/0183513 A1* | 7/2015 | Gerber | ..................... | B64C 5/02 244/130 |
| 2015/0360766 A1* | 12/2015 | Gerber | ................... | B64C 21/06 244/87 |
| 2016/0009374 A1 | 1/2016 | Glezer et al. | | |
| 2018/0086437 A1 | 3/2018 | Pastouchenko et al. | | |

FOREIGN PATENT DOCUMENTS

| | | |
|---|---|---|
| EP | 2 853 485 | 4/2015 |
| EP | 2 866 453 | 4/2015 |
| WO | 2009/023354 | 2/2009 |

OTHER PUBLICATIONS

International Search Report for PCT/EP2019/075025 dated Nov. 18, 2019, 4 pages.

Written Opinion of the ISA for PCT/EP2019/075025 dated Nov. 18, 2019, 7 pages.

\* cited by examiner

LEADING EDGE STRUCTURE FOR A FLOW CONTROL SYSTEM OF AN AIRCRAFT

CROSS REFERENCE TO RELATED APPLICATIONS

The present application is a National Phase of International Application Number PCT/EP2019/075025 filed Sep. 18, 2019, which designated the U.S. and claims priority benefits from German Patent Application Number DE 10 2018 122 908.9 filed Sep. 18, 2018, the entire contents of each of which are hereby incorporated by reference.

The present invention relates to a leading edge structure for a flow control system of an aircraft, in particular for a Hybrid Laminar Flow Control system, where air is sucked in a porous surface of a flow body in order to extend the region of laminar flow along the flow body. Further aspects of the present invention relate to a vertical tail plane comprising such a leading edge structure, an aircraft comprising such a leading edge structure or such a vertical tail plane, and a method for operating such an aircraft. It might also be possible and preferred that the leading edge structure is part of a horizontal tail plane or of a wing for an aircraft.

The leading edge structure comprises a leading edge panel that surrounds a plenum in a curved, i.e. arcuate, manner. The plenum extends in a span direction through the leading edge structure.

When viewed in a cross section across the span direction, the leading edge panel has a first side portion extending from a leading edge point, i.e. from a fore tip of the leading edge structure, to a first attachment end on a first side of the leading edge structure, the first attachment end being configured for attachment to a further structure located downstream from the leading edge. Further, the leading edge panel has a second side portion opposite the first side portion, wherein the second side portion extends from the leading edge point to a second attachment end on a second side of the leading edge structure opposite the first side, the second attachment end being configured for attachment to a further structure downstream from the leading edge.

The leading edge panel comprises an inner surface facing the plenum and an outer surface in contact with an ambient flow. Further, the leading edge panel comprises a plurality of micro pores, such as perforations, forming a fluid connection between the plenum and the ambient flow, so that air from the ambient flow can be sucked in through the micro pores into the plenum. The plenum is connected to an air outlet arrangement configured for causing an underpressure in the plenum, so that air from the ambient flow is drawn through the micro pores into the plenum and from there discharged though the air outlet arrangement into the ambient flow. The outlet arrangement may be a part of the leading edge structure or may be a separate part.

Such leading edge structures are known in the art of hybrid laminar flow control systems. For cleaning the pores from liquid and other contaminants during take-off and landing approach of the associated aircraft it is known to operate the suction system in a reversed manner, i.e. to blow out air from the plenum through the micro pores into the ambient flow. For that the pressure in the plenum needs to be higher as the external pressure of the ambient flow acting on the outer surface of the leading edge panel, which is usually achieved by a door opening in a forward direction to take in air from the ambient flow and pass it into the plenum by an inlet duct.

The object of the present invention is to provide a simpler leading edge structure with a reduced weight and improved internal aerodynamics.

This object is achieved in that the air outlet arrangement is configured to operate in a flow control mode where a first mass flow rate of air, adapted for flow control, from the ambient flow is drawn through the micro pores into the plenum. Further, the air outlet arrangement is configured to be operated in a cleaning mode where a second mass flow rate of air, adapted for cleaning the micro pores, from the ambient flow is drawn through the micro pores into the plenum. The second mass flow rate is essentially greater than the first mass flow rate. This means, cleaning of the micro pores is simply done by suction with an increased mass flow rate instead of by blowing. In such a way, no air inlet and no inlet duct are required anymore, so that the system can be simplified and weight can be saved. Also, internal aerodynamics of the system can be improved.

According to a preferred embodiment, the first mass flow rate is adapted for sucking in boundary layer from the ambient flow for flow control during cruise flight, and wherein the second mass flow rate is adapted for cleaning the micro pores from liquid and dirt during take-off and landing approach of an associated aircraft. Liquid and dirt contaminate the micro pores usually during climb and descend of the aircraft, while flow control is typically applied during cruise flight.

According to a further preferred embodiment, the second mass flow rate is between 200% and 400% greater, preferably between 250% and 350% greater, most preferred approximately 300% greater than the first mass flow rate. In such a way, an effective cleaning of the micro pores can be achieved.

According to a further preferred embodiment, the air outlet arrangement comprises a first air outlet connected to the plenum via a first duct. The first air outlet preferably comprises a pivotal first door that opens in a rearward direction with respect to an associated aircraft during flight. Preferably, the first door can be pivoted about a first pivot axis between a closed position where the first door is either flush with the outer skin or even slightly deflected inside and air flow through the first air outlet is inhibited, and at least one opened position where the first door is pivoted into the ambient flow so that a rearward-facing opening is formed between the first door and the outer skin to let air from the plenum out into the ambient flow. Preferably, the pivot axis is arranged vertically and at the leading edge side of the first air outlet. Such rearward facing opening causes an underpressure in the first duct and thus in the plenum, so that suction of air through the micro pores occurs.

In particular, it is preferred that the first door is configured to be set to a closed position where no mass flow of air can pass to the ambient flow, a first opened position corresponding to a predefined first opening angle for letting out the first mass flow rate of air into the ambient flow, and to a second opened position corresponding to a predefined second opening angle for letting out the second mass flow rate of air into the ambient flow. In such a way, the flow control mode and the cleaning mode can be performed with one single air outlet and one single door.

Alternatively, it is preferred that the air outlet arrangement comprises a second air outlet connected to the plenum via a second duct. The second air outlet preferably comprises a pivotal second door that opens in a rearward direction with respect to an associated aircraft during flight. The second door can be pivoted about a second pivot axis between a closed position where the second door is either flush with the outer skin or even slightly deflected inside and air flow through the second air outlet is inhibited, and at least one opened position where the second door is pivoted into the ambient flow so that a rearward-facing opening is formed between the second door and the outer skin to let air from the plenum out into the ambient flow. Preferably, the pivot axis is arranged vertically and at the leading edge side of second outlet. In such a way, the flow control mode and the cleaning mode can be performed using both first and second air outlet and the related first and second doors.

In particular, it is preferred that the first door is configured to be set to a closed position where no mass flow of air can pass to the ambient flow, and an opened position corresponding to a predefined opening angle for letting out the first mass flow rate of air.

The second door is configured to be set to a closed position where no mass flow of air can pass to the ambient flow, and an opened position corresponding to a predefined opening angle for letting out a third mass flow rate of air. The second mass flow rate corresponds to the sum of the first and third mass flow rates. In such a way, the flow control mode can be performed by setting the first door to the opened position and keeping the second door in the closed position, while the cleaning mode can be performed by setting both the first door and the second door to the opened position.

Alternatively, it is preferred that the first door is configured to be set to a first opened position corresponding to a predefined opening angle for letting out the first mass flow rate of air, and to a second opened position corresponding to a predefined second opening angle for letting out a fourth mass flow rate of air. The second door is configured to be set to an opened position corresponding to a predefined opening angle for letting out a third mass flow rate of air. The second mass flow rate corresponds to the sum of the third and fourth mass flow rates. In such a way, the flow control mode can be performed by setting the first door to the first opened position and keeping the second door in the closed position, while the cleaning mode can be performed by setting both the first door and the second door to the fully opened position, i.e. by setting the first door to the second opened position and the second door to the opened position. By having a second opened position for the first door the second mass flow rate can be further increased compared to the embodiment where only one opened position is available for the first door.

It is further preferred that the first air outlet is arranged on the side of the first side portion of the leading edge panel. I.e., the first air outlet is positioned on the side in which the first side portion extends, but is not necessarily positioned in the first side portion itself. Further, the second air outlet is arranged on the side of the second side portion of the leading edge panel opposite the first side portion, so that first and second air outlets face in opposite directions. I.e., the second air outlet is positioned on the side in which the second side portion extends, but is not necessarily arranged in the second side portion itself. In such a way, a symmetric arrangement of first and second air outlets is enabled, which is advantageous i.a. for aerodynamic reasons.

Alternatively, it is preferred that the first air outlet and the second air outlet are arranged together on one side, namely either on the side of the first side portion of the leading edge panel or on the side of the second side portion of the leading edge panel. Preferably, the first air outlet and the second air outlet are arranged adjacently in the span direction, wherein a pivot axis of the first door is preferably aligned with a pivot axis of the second door. In such a way, the first and second air outlets can be formed together thereby requiring minimum structural parts.

According to a further preferred embodiment, the leading edge structure further comprises a back wall connecting the first attachment end to the second attachment end of the leading edge panel, thereby enclosing the plenum on a side opposite the leading edge point. The back wall is preferably formed as a membrane, e.g. of fiber reinforced plastic.

According to a preferred embodiment, the leading edge panel has a double-walled form including an inner wall element having the inner surface and, preferably spaced apart from the inner wall element, an outer wall element having the outer surface. Such a double-walled form provides advantageous mechanical properties.

In particular, it is preferred that between the inner and outer wall elements the leading edge panel comprises a plurality of elongate stiffeners connecting the inner and outer wall elements and spaced apart from one another, so that between each pair of adjacent stiffeners a hollow chamber is formed between the inner and outer wall elements. Preferably, the stiffeners might be formed integrally with the inner wall element, extend in the span direction, and have a solid and/or square-shaped or trapezoid-shaped cross section. Further preferably, the inner wall element is formed of a fiber reinforced plastic (FRP), the stiffeners are formed as sandwich structures, and the outer wall element is formed as a titanium or steel sheet. In such a way, a simple and reliable double-walled structure is provided.

It is further preferred that the outer wall element comprises the plurality of micro pores forming a fluid connection between the hollow chambers and the ambient flow. In particular, the outer wall element comprises multiple sections, wherein the porosity varies from one section to another section in terms of pore diameter and/or pore pitch. The inner wall element comprises openings forming a fluid connection between the hollow chambers and the plenum. Preferably each hollow chamber comprises at least one opening. Preferably, the openings might be formed as throttle holes having a predefined diameter adapted for a predefined mass flow rate through the throttle holes in order to achieve a predefined fluid pressure in the hollow chambers. Alternatively, the openings might be formed as simple holes having such a diameter that essentially the same pressure is present in the hollow chambers as in the plenum.

A further aspect of the present invention relates to a vertical tail plane for an aircraft. The vertical tail plane comprises a vertical tail plane box and a leading edge structure according to any of the embodiments described herein. The vertical tail plane box has a first lateral panel with a first attachment portion and an opposite second lateral panel with a second attachment portion. The first attachment end of the leading edge structure is attached to the first attachment portion and the second attachment end is attached to the second attachment portion, so that the first side portion of the leading edge panel forms a continuous flow surface with the first lateral panel of the vertical tail plane box and the second side portion of the leading edge panel forms a continuous flow surface with the second lateral panel of the vertical tail plane box. The features and advantages described in connection with the leading edge structure apply vis-A-vis to the vertical tail plane.

According to a preferred embodiment, the first air outlet and/or the second air outlet is arranged in the first lateral panel and/or in the second lateral panel and/or in another leading edge panel arranged beside the leading edge structure in the span direction. Preferably, the first and second ducts extend through the space between the vertical tail plane box and the leading edge panel. Preferably, the first air outlet and the second air outlet are arranged on opposite sides of the vertical tail plane in a symmetric manner.

A further aspect of the present invention relates to an aircraft comprising a leading edge structure according to any of the embodiments described herein, or comprising a vertical tail plane according to any of the embodiment described herein. The features and advantageous described in connection with the leading edge structure and the vertical tail plane apply vis-à-vis to the aircraft.

According to a preferred embodiment, the aircraft further comprises a control unit configured to operate the air outlet arrangement in the flow control mode by setting the first door to the opened position and keeping the second door in the closed position, and in the cleaning mode by setting both first and second doors to the opened position, preferably depending on whether the aircraft is performing cruise flight or take-off and landing approach, respectively.

According to a preferred embodiment, the aircraft further comprises a control unit configured to operate the air outlet arrangement in the flow control mode by setting the first door to the first opened position and keeping the second door in the closed position, and in the cleaning mode by setting the first door to the second opened position and the second door to the opened position, preferably depending on whether the aircraft is performing cruise flight or take-off and landing approach, respectively.

A further aspect of the present invention relates to a method for operating the aircraft according to any of the embodiments described above, wherein during cruise flight the air outlet arrangement is operated in the flow control mode by setting the first door to the opened position and keeping the second door in the closed position, and wherein during take-off and landing approach the air outlet arrangement is operated in the cleaning mode by setting both first and second doors to the opened position. Alternatively, it is preferred that during cruise flight the air outlet arrangement is operated in the flow control mode by setting the first door to the first opened position and keeping the second door in the closed position, while during take-off and landing approach the air outlet arrangement is operated in the cleaning mode by setting the first door to the second opened position and the second door to the opened position. The features and advantageous described in connection with the leading edge structure, the vertical tail plane and the aircraft, apply vis-à-vis to the method for operating the aircraft.

A preferred embodiment of the present invention is described hereinafter in more detail by means of a drawing. The drawing shows in FIG. 1 a perspective view of an aircraft according to the invention, FIG. 2 a side view of a vertical tail plane according to the invention, and FIG. 3 a cross sectional view across the span direction of a leading edge structure according to the invention.

In FIG. 1 an aircraft 1 according to an embodiment of the present invention is shown. The aircraft comprises a fuselage 3, wings 5, a horizontal tail plane 7, and a vertical tail plane 9 according to an embodiment of the invention. The vertical tail plane 9 is shown in more detail in FIG. 2. The vertical tail plane 9 comprises a leading edge structure 11 according to an embodiment of the invention. The leading edge structure 11 is shown in more detail in FIG. 3.

The leading edge structure 11 is configured for a hybrid laminar flow control system and comprises a leading edge panel 13 and a back wall 15. The leading edge panel 13 surrounds a plenum 17 in a curved manner. The plenum 17 extends in a span direction 19 through the leading edge structure 11. When viewed in a cross section across the span direction 19, the leading edge panel 13 has a first side portion 21 extending from a leading edge point 23 to a first attachment end 25 on a first side of the leading edge structure 11. Further, the leading edge panel 13 has a second side portion 27 opposite the first side portion 21, wherein the second side portion 27 extends from the leading edge point 23 to a second attachment end 29 on a second side of the leading edge structure 11 opposite the first side. The back wall 15 connects the first attachment end 25 to the second attachment end 29 of the leading edge panel 13, thereby enclosing the plenum 17 on a side opposite the leading edge point 23.

The leading edge panel 13 has a double-walled form including an inner wall element 31 having an inner surface 33 facing the plenum 17, and an outer wall element 35 having an outer surface 37 in contact with an ambient flow 39. Between the inner and outer wall elements 31, 35 the leading edge panel 13 comprises a plurality of elongate stiffeners 41 extending in the span direction 19 and spaced apart from one another, so that between each pair of adjacent stiffeners 41 a hollow chamber 43 is formed between the inner and outer wall elements 31, 35. The stiffeners 41 are formed integrally with the inner wall element 31 in a sandwich form and have a solid, trapezoid-shaped cross section. The inner wall element 31 is formed of a fiber reinforced plastic (FRP). The outer wall element 35 is formed as a titanium sheet and comprises a plurality of micro pores 45 forming a fluid connection between the hollow chambers 43 and the ambient flow 39. The inner wall element 31 comprises openings 47 forming a fluid connection between the hollow chambers 43 and the plenum 17.

Figure 3:
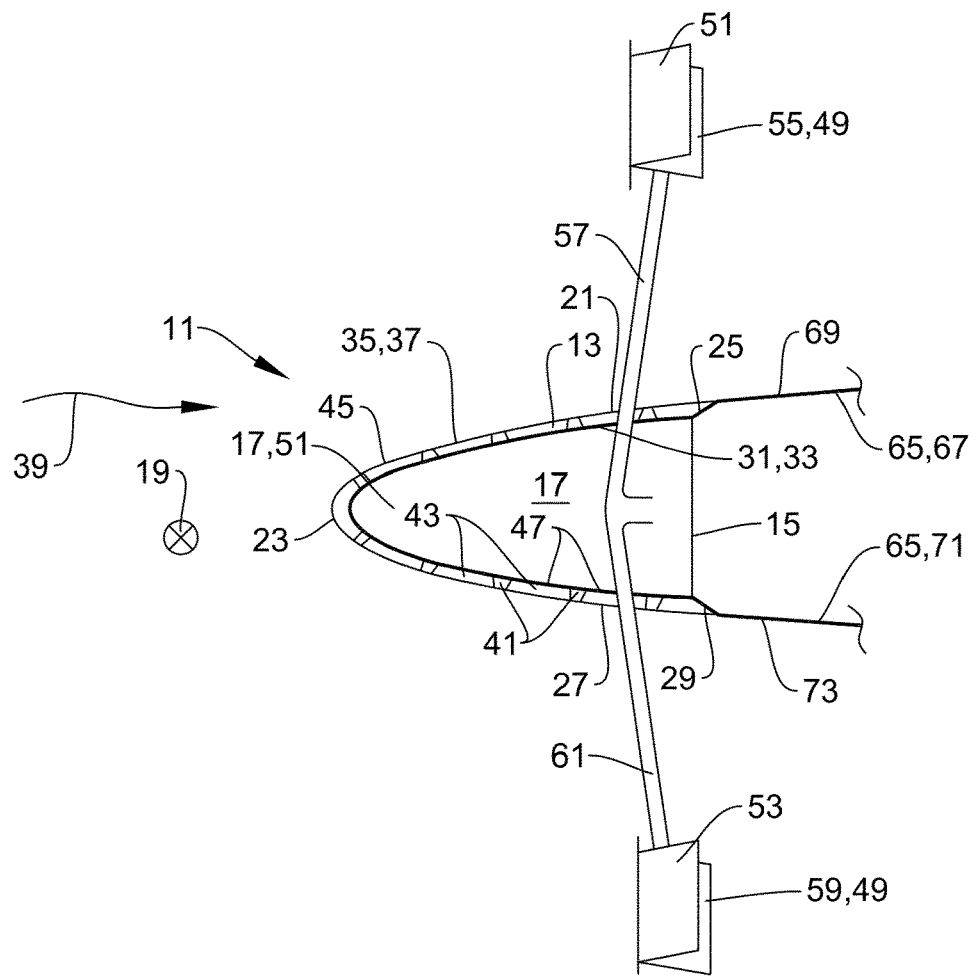

As shown in FIG. 3, the plenum 17 is connected to an air outlet arrangement 49 configured for causing an underpressure in the plenum 17, so that air from the ambient flow 39 is drawn through the micro pores 45 into the plenum 17 and from there discharged through the air outlet arrangement 49 into the ambient flow 39. The air outlet arrangement 49 is configured to operate in a flow control mode where a first mass flow rate of air, adapted for sucking in boundary layer from the ambient flow 39 for flow control during cruise flight, is drawn through the micro pores 45 into the plenum 17. Further, the air outlet arrangement 49 is configured to be operated in a cleaning mode where a second mass flow rate of air, adapted for cleaning the micro pores 45 from liquid and dirt during take-off and landing approach of the aircraft 1, from the ambient flow 39 is drawn through the micro pores 45 into the plenum 17. The second mass flow rate is approximately 300% greater than the first mass flow rate.

The air outlet arrangement 49 comprises a first air outlet 55 connected to the plenum 17 via a first duct 57. The first air outlet 55 comprises a pivotal first door 51 that opens in a rearward direction. Further, the air outlet arrangement 49 comprises a second air outlet 59 connected to the plenum 17 via a second duct 61. The second air outlet 59 comprises a pivotal second door 53 that opens in a rearward direction. The first door 51 is configured to be set to a closed position where no mass flow of air can pass to the ambient flow 39, to a first opened position corresponding to a predefined opening angle for letting out the first mass flow rate of air, and to a second opened position corresponding to a predefined second opening angle for letting out a fourth mass flow rate of air. The second door 53 is configured to be set to a closed position where no mass flow of air can pass to the ambient flow 39, and an opened position corresponding to a predefined opening angle for letting out a third mass flow rate of air. The second mass flow rate corresponds to the sum of the third and fourth mass flow rates. The first air outlet 55 is arranged on the side of the first side portion 21 of the leading edge panel 13, and the second air outlet 59 is arranged on the side of the second side portion 27 of the leading edge panel 13 opposite the first side portion 21, so that first and second air outlets 55, 59 face in opposite directions.

Figure 2:
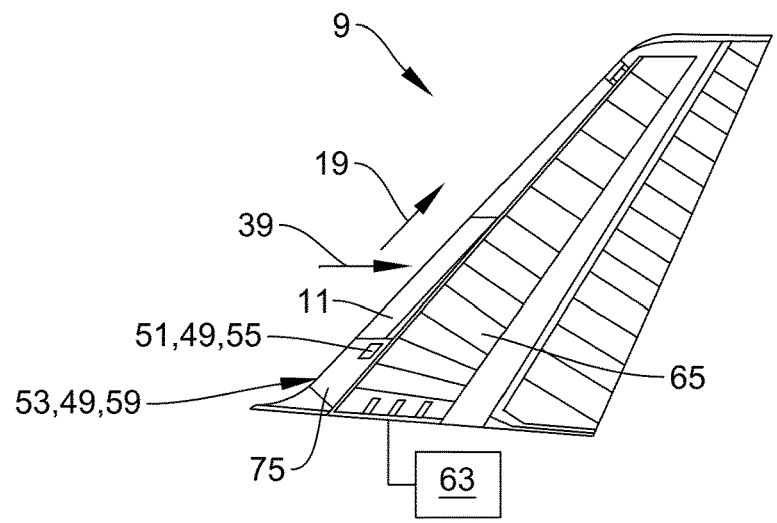

As shown in FIGS. 2 and 3, the vertical tail plane 9 comprises a vertical tail plane box 65 and the leading edge structure 11 mounted to the vertical tail plane box 65. The vertical tail plane box 65 has a first lateral panel 67 with a first attachment portion 69 and an opposite second lateral panel 71 with a second attachment portion 73. The first attachment end 25 of the leading edge structure 11 is attached to the first attachment portion 69 and the second attachment end 29 is attached to the second attachment portion 73, so that the first side portion 21 of the leading edge panel 13 forms a continuous flow surface with the first lateral panel 67 of the vertical tail plane box 65 and the second side portion 27 of the leading edge panel 13 forms a continuous flow surface with the second lateral panel 71 of the vertical tail plane box 65. The first air outlet 55 and the second air outlet 59 are arranged on opposite sides in another leading edge panel 75 beside the leading edge structure 11 with respect to the span direction 19, specifically below the leading edge structure 11. The first and second ducts 57, 61 extend through the space between the vertical tail plane box 65 and the other leading edge panel 75.

The aircraft 1 further comprises a control unit 63, as shown in FIG. 2, configured to operate the air outlet arrangement 49 in the flow control mode by setting the first door 51 to the first opened position and keeping the second door 53 in a closed position, and in the cleaning mode by setting the first door 51 to the second opened position and second door 53 to the opened position, depending on whether the aircraft 1 is performing cruise flight or take-off and landing approach, respectively.

The invention claimed is:

1. A leading edge structure for a flow control system of an aircraft, comprising:
a leading edge panel that surrounds a plenum in a curved manner, the plenum extending in a span direction,
wherein the leading edge panel has a first side portion extending from a leading edge point to a first attachment end,
wherein the leading edge panel has a second side portion opposite the first side portion, extending from the leading edge point to a second attachment end,
wherein the leading edge panel comprises an inner surface facing the plenum and an outer surface in contact with an ambient flow, and
wherein the leading edge panel comprises a plurality of micro pores forming a fluid connection between the plenum and the ambient flow,
wherein the plenum is connected to an air outlet arrangement configured for causing an underpressure in the plenum, so that air from the ambient flow is drawn through the micro pores into the plenum and from there discharged through the air outlet arrangement into the ambient flow,
wherein the air outlet arrangement comprises a first air outlet having a pivotal first door and a second air outlet having a pivotal second door separate from the pivotal first door,
wherein the air outlet arrangement is configured to operate in
a flow control mode where a first mass flow rate of air from the ambient flow is drawn through the micro pores into the plenum by setting the pivotal first door to the first opened position and keeping the pivotal second door in a closed position, and in
a cleaning mode where a second mass flow rate of air from the ambient flow is drawn through the micro pores into the plenum by setting the pivotal first door to the second opened position and the pivotal second door to the opened position,
wherein the second mass flow rate is greater than the first mass flow rate.

2. The leading edge structure according to claim 1, wherein the first mass flow rate is adapted for sucking in boundary layer from the ambient flow for flow control, and wherein the second mass flow rate is adapted for cleaning the micro pores from liquid and dirt during take-off and landing approach.

3. The leading edge structure according to claim 1, wherein the second mass flow rate is between 200% and 400% greater than the first mass flow rate.

4. The leading edge structure according to claim 1, wherein the first air outlet is connected to the plenum via a first duct and the pivotal first door that opens in a rearward direction.

5. The leading edge structure according to claim 4, wherein the pivotal first door is configured to be set to a first opened position corresponding to a predefined first opening angle for letting out the first mass flow rate of air, and to a second opened position corresponding to a predefined second opening angle for letting out the second mass flow rate of air.

6. The leading edge structure according to claim 4, wherein the second air outlet connected to the plenum via a second duct and the pivotal second door that opens in a rearward direction.

7. The leading edge structure according to claim 6, wherein the pivotal first door is configured to be set to an opened position corresponding to a predefined opening angle for letting out the first mass flow rate of air,
wherein the pivotal second door is configured to be set to an opened position corresponding to a predefined opening angle for letting out a third mass flow rate of air, and
wherein the second mass flow rate corresponds to the sum of the first and third mass flow rates.

8. The leading edge structure according to claim 6, wherein the pivotal first door is configured to be set to a first opened position corresponding to a predefined opening angle for letting out the first mass flow rate of air, and to a second opened position corresponding to a predefined second opening angle for letting out a fourth mass flow rate of air,
wherein the pivotal second door is configured to be set to an opened position corresponding to a predefined opening angle for letting out a third mass flow rate of air, and
wherein the second mass flow rate corresponds to the sum of the third and fourth mass flow rates.

9. The leading edge structure according to claim 6, wherein the first air outlet is arranged on the side of the first side portion of the leading edge panel, and
wherein the second air outlet is arranged on the side of the second side portion of the leading edge panel opposite the first side portion.

10. The leading edge structure according to claim 6, wherein the first air outlet and the second air outlet are arranged together either on the side of the first side portion of the leading edge panel or on the side of the second side portion of the leading edge panel,
 wherein the first air outlet and the second air outlet are arranged adjacently in the span direction, and
 wherein a pivot axis of the pivotal first door is aligned with a pivot axis of the pivotal second door.

11. A vertical tail plane for an aircraft, comprising:
a vertical tail plane box having a first lateral panel with a first attachment portion and an opposite second lateral panel with a second attachment portion,
a leading edge structure according to claim 1,
 wherein the first attachment end is attached to the first attachment portion, and wherein the second attachment end is attached to the second attachment portion, so that the first side portion of the leading edge panel forms a continuous flow surface with the first lateral panel of the vertical tail plane box, and the second side portion of the leading edge panel forms a continuous flow surface with the second lateral panel of the vertical tail plane box.

12. The vertical tail plane according to claim 11, wherein the first air outlet and the second air outlet are arranged in the first lateral panel, the second lateral panel, or in another leading edge panel arranged beside the leading edge structure in the span direction.

13. An aircraft comprising a leading edge structure according to claim 1.

14. The aircraft according to claim 13, further comprising a control unit configured to operate the air outlet arrangement.

15. The leading edge structure according to claim 1, wherein the second mass flow rate is between 250% and 350% greater than the first mass flow rate.

16. The leading edge structure according to claim 1, wherein the second mass flow rate is 300% greater than the first mass flow rate.

17. An aircraft, comprising a vertical tail plane according to claim 11.

* * * * *